United States Patent
Tamura et al.

[11] Patent Number: 6,007,599
[45] Date of Patent: Dec. 28, 1999

[54] METHOD FOR RE-UTILIZING SCRAP STEELS

[75] Inventors: Fumihiko Tamura; Kanehiro Ogawa; Hiroshi Matsumoto, all of Kakogawa, Japan

[73] Assignee: Kabushiki Kaisha Kobe Seiko Sho, Kobe, Japan

[21] Appl. No.: 08/994,566

[22] Filed: Dec. 19, 1997

[30] Foreign Application Priority Data

Dec. 20, 1996 [JP] Japan ................................ 8-342130

[51] Int. Cl.⁶ ............................... C22B 9/16; C22B 25/00
[52] U.S. Cl. ................................. 75/581; 75/401; 75/690
[58] Field of Search ............................. 75/401, 581, 690, 75/691

[56] References Cited

U.S. PATENT DOCUMENTS

| | | | |
|---|---|---|---|
| 1,446,953 | 2/1923 | Welch et al. | 75/401 |
| 4,518,423 | 5/1985 | Herter | 75/401 |

FOREIGN PATENT DOCUMENTS

| | | | |
|---|---|---|---|
| 31 10 871 | 10/1982 | Germany . | |
| 7-145431 | 6/1995 | Japan . | |
| 12917 | of 1892 | United Kingdom | 75/581 |

*Primary Examiner*—Melvyn Andrews
*Attorney, Agent, or Firm*—Oblon, Spivak, McClelland, Maier & Neustadt, P.C.

[57] ABSTRACT

A methods for re-utilizing, for example, scrap steels are provided. A method is provided for separating Sn-containing oxides from steel by blowing Sn-containing oxides away from a steel using a gas. Also provided is a method of making a reclaimed steel by (a) heating a coated steel having an Sn-containing surface layer to oxidize at least a portion of the surface layer;

(b) separating at least a portion of the surface layer from the coated steel to produce Sn-containing oxides and an uncoated steel;

(c) blowing the Sn-containing oxides away from the uncoated steel using an exhaust gas, where steps (a), (b), and (c) are conducted in a first reaction zone;

(d) melting the steel in a second reaction zone to produce the reclaimed steel and an exhaust gas; and

(e) recycling at least a portion of the exhaust gas produced in the second reaction zone to the first reaction zone for use in the blowing step, where steps (a), (b), (c), (d), and (e) are conducted simultaneously.

18 Claims, 6 Drawing Sheets

METHOD FOR RE-UTILIZING SCRAP STEELS

BACKGROUND OF THE INVENTION

1. Field of The Invention

The present invention relates to a method for re-utilizing steels, especially scrap steels, and more particularly, to a method for making a reclaimed steel by providing scrap steels formed thereon with a Sn surface layer mainly composed of Sn, removing the Sn surface layer from the scrap steels, and then refining the scrap steels by melting.

2. Description of the Background Art

Sn-plated steels are formed with a stable oxide film on the surface thereof, and thus, have a beautiful gloss. These steels are widely used as containers for foods and as cans for beverage products. Recently, much progress has been made in recycling steel beverage containers from the standpoint of effective utilization of resources. In this manner, steels can be re-used. For the re-utilization, i.e., recycling, of scrap steels, the usual practice is to initially charge a scrap steel into a melting furnace and then melt the steel, where a flux is added in order to collect and remove impurity elements as a slag. However, Sn is an element which is difficult to remove under the steel making conditions currently used, and is thus liable to remain in the molten steel. If Sn is present in the steel, not only is the quality of the steel degraded, but also Sn segregates in the grain boundary at the time of heating for rolling during the course of steel making, so that the hot workability of the steel is considerably reduced. In fact, if the amount of Sn in the molten steel is high enough, then it may be impossible to obtain a reclaimed steel having the desired physical properties. Accordingly, where Sn is present in molten steel in amounts exceeding its tolerance limit, it is usual to dilute the molten steel with a molten steel having a reduced amount of Sn in order to obtain a steel having the tolerance limit of Sn.

Many methods have been hitherto proposed for removing a Sn surface layer from Sn-coated steels and these methods include, in addition to the above-mentioned method using fluxes, a method wherein Sn is removed from a molten steel by evacuating a melting furnace under vacuum, thereby permitting low melting Sn to be converted to and evaporated as a gaseous component. However, leaving molten steel under vacuum leads to poor production efficiency and is, therefore, generally not suitable for industrial operations.

Several attempts have been made to remove the Sn surface layer prior to the melting of scrap steels, including (1) an alkali electrolytic method wherein a scrap steel is immersed in an alkali aqueous solution, to which a potential is applied thereby causing Fe to be passivated and Sn to be acceleratedly dissolved, and (2) a sulfurization method wherein an Sn-plated steel sheet is sulfurized in the presence of sulfur thereby causing Sn to be separated as SnS. The former alkali electrolytic method (1) is poor in efficiency, with the attendant problem that the production cost is too high. The latter sulfurization method (2) suffer from the problem of how to treat the sulfur-containing waste gases, and this method has not been put into practice.

In order to provide a method for efficiently removing an Sn surface layer in a solid state without involving any treatment of waste gases and incurring high costs, we have already proposed, in Japanese Laid-open Patent Application Hei 7-145431, a method wherein Sn-plated scrap steels are heated in an oxidative atmosphere at 500 to 1000° C. to convert the Sn surface layer to corresponding oxides, followed by mechanical separation of the oxides.

This method requires a large amount of heat energy. In this process, and a large amount of a hot exhaust gas is produced in the melting furnace. This exhaust has is discharged from a melting furnace, to the outside environment. Therefore, the thermal energy contained in this exhaust gas is wasted. Accordingly, this process may be improved upon by effectively utilizing the heat energy of the exhaust gas. In other words, in order to further improve the production efficiency of this method, it is important that the heat loss is reduced to an extent as small as possible by combining the Sn-removing step and the melting step. In addition, the removal rate of Sn to be removed by the method is as low as about 40 to 50%. Accordingly, there is a demand of improving the Sn removal rate.

SUMMARY OF THE INVENTION

It is an object of the present invention to provide method for re-utilizing Sn-plated steels, especially scrap steels, which overcome the problems associated with the methods described above.

Another object of the present invention is to provide an improved method for separating the Sn-containing oxides produced during the recycling of Sn-coated steels after the Sn-coating is removed.

Another object of the invention is to provide a method for re-utilizing Sn-plated scrap steels in which heat energy, which has been hitherto discharged from the melting step without utilization thereof, is effectively utilized in the process and the Sn removal rate may be improved thereby.

The objects of the present invention, and others, are accomplished with a method of separating Sn-containing oxides from steel by blowing Sn-containing oxides away from the steel using a gas.

The objects of the present invention are also accomplished with a method of making a reclaimed steel, including:

(a) heating a coated steel having a Sn-containing surface layer to oxidize at least a portion of the surface layer;

(b) separating at least a portion of the surface layer from the coated steel to produce Sn-containing oxides and an uncoated steel;

(c) blowing the Sn-containing oxides away from the uncoated steel using an exhaust gas, where steps (a), (b), and (c) are conducted in a first reaction zone;

(d) melting the steel in a second reaction zone to produce the reclaimed steel and an exhaust gas; and (e) recycling at least a portion of the exhaust gas produced in the second reaction zone to the first reaction zone for use in the blowing step, where steps (a)–(e) are conducted simultaneously.

Using the methods of the present invention, reclaimed steels having a reduced Sn content may be prepared with higher production efficiency.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

In the method described in Japanese Laid-open Patent Application No. Hei 7-145431, after an Sn surface layer-bearing scrap steel has been thermally oxidized or while the scrap steel is thermally oxidized, the Sn-containing oxides are mechanically separated and removed. However, the separation between the oxide-free steel and the oxides is effected in a subsequent step using, for example, a shaking or vibrating screen. This eventually leads to the lowering of a steel temperature during the course of the separation between the steel and the oxides. When the steel is then charged into a melting furnace, it must be re-heated. Where an electric furnace is used as the melting furnace, an oxygen gas is fed for the purpose of the temperature control in the furnace. In this process, the hot exhaust gas is merely discharged to the outside environment. Accordingly, the method disclosed in Japanese Laid-open Patent Application No. Hei 7-145431 does not utilize the heat energy produced in the melting step.

We have paid attention to the use of an exhaust gas from a melting steel in an Sn-removing step by the continuous and direct connection between the Sn-removing step and the melting step and also the effective use of the heat energy of an exhaust gas from a melting furnace by oxidation of Sn and also by separation and removal of the resultant Sn oxides. In order to directly connect the Sn-removing step and the melting step with each other, it is essential to reliably remove Sn oxides from the steel in the Sn-removing step and discharge the thus removed oxides to the outside environment, i.e., away from the uncoated steel before melting the uncoated steel. Accordingly, in the present process, the coated steel may be uncoated in a first reaction zone, where Sn-containing oxides are formed, and then melted in a second reaction zone. At least a portion of the hot exhaust gas produced in the melting step, i.e., the second reaction zone, may be recycled to the first reaction zone. This recycled hot gas may remove the Sn-containing oxides from the uncoated steel and may also assist in oxidizing the Sn-containing layer of the coated steel.

Figure 1:
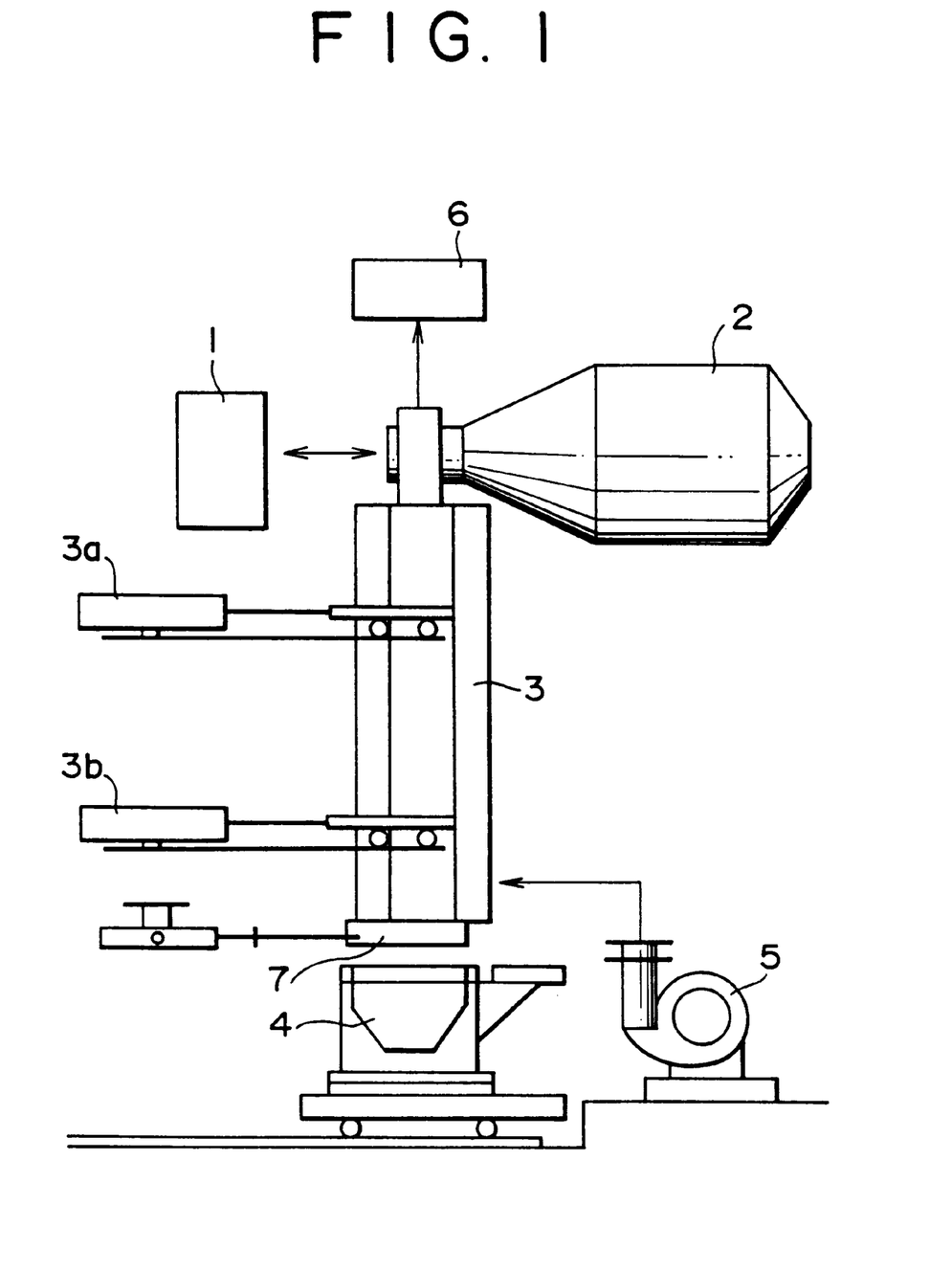
FIG. 1 is a schematic illustrative view showing a pretesting device used in the present invention.

To this end, we conducted the following test and, as a result, discovered that Sn oxides could be effectively removed with the aid of a wind force having a predetermined velocity or more, i.e., by blowing with a gas. The present invention has been accomplished based on this finding. More particularly, for the purpose of determining the wind force necessary for collecting, in a dust collector, Sn oxides which have been formed by thermal oxidation of a Sn-plated steel, a test was conducted on a pilot plant scale using the apparatus shown in FIG. 1. In FIG. 1, 1 is a starting material feeder, 2 is a rotary retort furnace, 3 is a shoot box, 3a and 3b are, respectively, a shoot box moving device, 4 is a sample-receiving pan, 5 is an air blower, and 6 is a dust collector. The rotary retort furnace 2, which has a stainless steel reaction tube (having a treating capacity of 100 kg/batch) having a diameter of 100 cm at a cylindrical portion thereof and a length of 100 cm and which is provided with an electric furnace capable of heating to the utmost limit of 1000° C. The maximum number of rotations of the reaction tube is 20 r.p.m., and is variable. The shoot box 3 with which separation conditions using a wind force are determined can be changed in sectional area by use of the moving devices 3a, 3b. In addition, the shoot box 3 is so arranged that the wind velocity obtained is 21 m/second (calculated at room temperature) in maximum by controlling an air quantity from the air blower 5.

Figure 2:
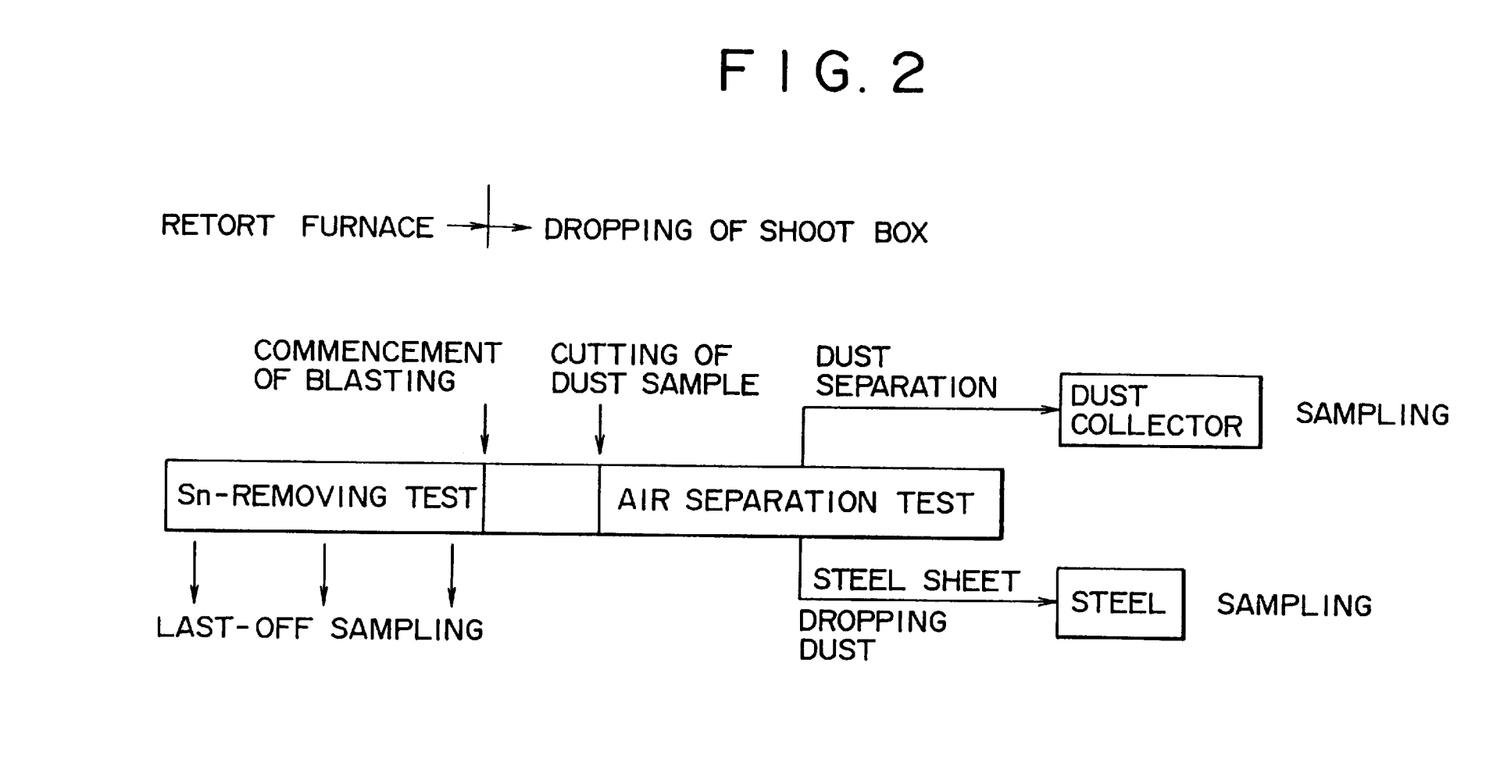
FIG. 2 is an illustrative view showing a testing method used in the present invention.

The outline specifications of the respective test devices are indicated in Table 1, and the testing procedure is shown in FIG. 2.

TABLE 1

SPECIFICATION OF TEST DEVICES

| | |
|---|---|
| Starting Material Feeder | Capacity of Hopper: 65 liters |
| | Feed Rate of Electromagnetic Feeder; |
| | 100 kg/1.5 minutes |
| Rotary Retort Furnace | Throughoutput Capacity: 100 kg/batch |
| | Dimension of Retort: 100 cm in Cylindrical |
| | Portion X 100 cm in Diameter |
| | Material: SUS310S |
| | Heater: 144 kW |
| | Heating Temperature: 1000° C. in maximum |
| | Number of Rotations: 20 r.p.m. in maximum |
| ShootBox | Sectional Area: 0.064 to 0.148 $m^2$ |
| | Wind Velocity: 0.3 to 21 m/second |
| Air Blower | Static Pressure: 10 mm aq. |
| | Air Quantity: 80 $m^3$/minute |
| Dust Collector | Filtration Area of Bag Filter: 55 $m^2$ |
| | Exhaust fan: 80 $m^2$/minute |

Sn-plated steel pieces having a regular square with a side of about 50 mm were provided as a starting material. 100 kg of the starting material was fed into the rotary retort furnace 2 heated to 950° C. in air in about 1.5 minutes by means of an electromagnetic feeder of the starting material feeder 1. Any of thick plate cut pieces, stainless steel balls, or tungsten balls indicated in Table 2 were added to the rotary retort furnace, followed by heating for about 20 minutes for oxidation and subsequently discharged from the furnace into the shoot box 3.

TABLE 2

| Type of Impactor | Ratio by Weight of Impactor/ Sample | Size of Impactor | Number of Cutting Rotations (r.p.m.) | Wind Velocity (m/second) | Heating Temperature (°C.) |
|---|---|---|---|---|---|
| Thick Plate Pieces | 1.0 | 30 mm square | 10 | 0.3 | 950 |
| Stainless Steel Balls | 4.4 | 30 mm in diameter | 20 | 1.5 | 950 |
| Tungsten Balls | 6.7 | 30 mm inn diameter | 20 | 3.0 | 950 |

The Sn oxides which were released and separated from the steel sheet by means of the wind force supplied from the air blower were collected by means of the dust collector 6 located above the shoot box 3. The Sn oxides which were not collected in the dust collector were dropped in the shoot box 3 along with the steel pieces and the impactor and collected in the sample receiving pan 4, followed by separation into the steel pieces and the Sn oxides by means of the vibration screen.

Figure 3:
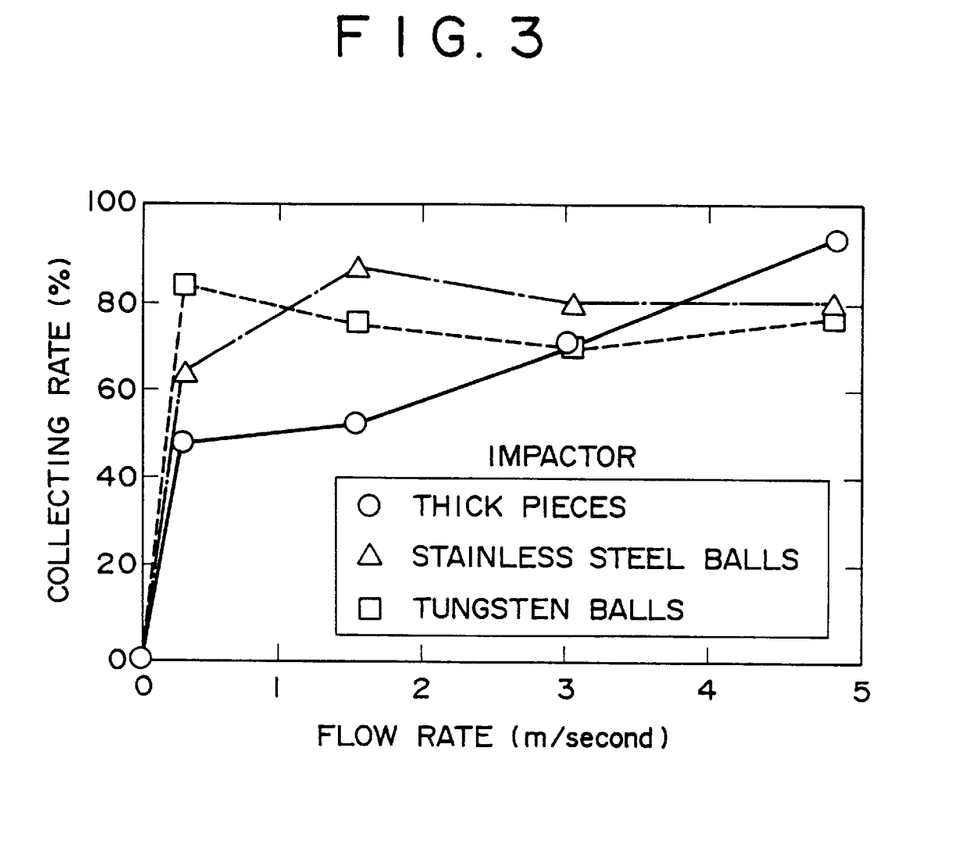
FIG. 3 is a graph showing the results of a test concerning the relation between the collection rate of oxides and the gas flow rate for different types of impactors.

The wind velocity in the shoot box 3 was preliminarily checked by means of an anemometer, and the weights of the Sn oxides collected in the dust collector 6 and the Sn oxides dropped in the sample receiving pan 4 were, respectively, measured up to a maximum wind velocity of 5 m/second. The ratio by weight of the Sn oxides collected by the action of the wind force from the dust collector to the released and separated Sn oxides is taken as a collection ratio and is shown in FIG. 3 relative to the wind velocity. According to this test, it was found that the Sn oxides could be separable when using a wind velocity of 0.3 m/second or greater. Accordingly, the hot exhaust gas should preferably be introduced into the rotary kiln at a flow rate of at least 0.3 m/second.

In the practice of the invention, the steel melting furnace may be a converter, an electric furnace, a hot metal pretreatment furnace and the like. The separation and release device provided at the exhaust gas discharge port of the melting furnace should preferably be a rotary kiln, by which while a scrap steel is rotated, the Sn surface layer is oxidized. The rotation speed of the rotary kiln is generally not smaller than 0.2 r.p.m., preferably not smaller than 1 r.p.m., and more preferably not smaller than 5 r.p.m. A longer residence time within the rotary kiln results in a higher removal rate of Sn, but will lower the yield of iron and the production efficiency. It is preferred that the upper limit of the residence time is about 20 to 50 minutes.

For carrying out the above re-utilization method, a discharge port of the steel melting furnace may be connected with an exhaust port of a rotary kiln, wherein the Sn-plated scrap steel is thermally oxidized. The hot oxidative exhaust gas discharged from the steel melting furnace may then pass into the rotary kiln. The Sn-containing oxides produced in the rotary kiln are then discharged by entrainment with the hot oxidative exhaust gas. The discharge port of the steel melting furnace may be directly connected with the exhaust port of the rotary kiln (see FIG. 4a). It is preferred to provide a vertical duct between the discharge port of the hot oxidative exhaust gas discharged from the melting furnace and the exhaust port of the rotary kiln and to remove the oxide from the scrap steel in the rotary kiln and the vertical duct (see FIG. 4b). The duct is substantially vertical, which means that the duct may have some degree of curvature with respect to connecting the first and second reaction zones.

In order to mechanically separate the Sn surface layer from the surface layer-bearing scrap steel while thermally oxidizing, it is preferred to add an impactor to the scrap steel. The ratio by weight between the impactor and the scrap steel should preferably be not smaller than 1. The mixing of an impactor with the scrap steel offers more chances of giving impacts on the scrap steel and ensures efficient and reliable separation of the Sn oxides from the steel scrap. Examples of the impactor include cut pieces of a thick sheet, stainless steel balls, tungsten balls and the like. The ratio by weight of the impactor to the scrap steel should preferably be at least 1, more preferably at least 10.

When a vertical duct is interposed between the exhaust gas discharge port and the exhaust portion of the rotary kiln, the dropping direction of the oxides on their passage through the vertical duct is in countercurrent relation with the hot oxidative exhaust gas stream raising through the vertical duct. Eventually, the hot oxidative exhaust gas stream acts strongly on the oxides, enabling one to shorten a treating time within the rotary kiln.

For facilitating the separation and removal of the oxides, the wind velocity should preferably be greater. In order to attain a high wind velocity, a greater amount of oxygen gas may be supplied to the melting furnace. Alternatively, there may be used, for example, a method wherein air is introduced from the connection portion between the melting furnace and the oxidation device, or a method wherein a gas generated from the surface of the melt within the melting furnace is secondarily combusted. Within a low wind velocity range, it is preferred to increase the amount of the impactor so as to increase separation power.

For the thermal oxidation of the Sn surface layer, if the heating temperature is too low, oxidation to a level of the plated interface is not possible, thus leading to unsatisfactory removal of Sn. On the other hand, when the heating temperature is too high, the steel pieces are softened and partially fused together. In this sense, it is preferred to use a temperature ranging from 500 to 1000° C. for this purpose. Within this temperature range, a higher temperature ensures thermal oxidation within a shorter time. The temperature is preferably 700° C. or more, more preferably 800° C. or more.

In order to increase the removal rate of Sn, a higher concentration of oxygen in the atmosphere of the oxidation device is preferred. The concentration of oxygen should preferably be 5%, more preferably 20% or more.

The time required for the oxidation of the Sn surface layer may change depending on the ambient temperature and the concentration of oxygen. In an atmosphere of air, the Sn surface layer may be oxidized in about 10 minutes at 950° C. and in about 2 minutes at 1000° c.

The heat energy required for the melting of a steel in an electric furnace is generally about 1150 Mcal/ton. According to the method of the invention, the steel material can be preheated to about 1000° C., so that a heat energy of about 200 Mcal/ton (about 17%) can be effectively utilized.

The Sn-coated steel starting material of the present process has a surface layer which contains tin. Of course, as is well-known in the art, the amount of tin in the coating layer may vary widely. At least a portion of the coating layer is removed during the oxidation-separation procedure. Preferably, all of the coating layer is removed. In the blowing step, at least a portion of the Sn-containing oxides are removed from the uncoated steel. Of course, it is most preferred to remove all of the Sn-containing oxides from the uncoated steel. At least a portion of the hot exhaust gas produced in the melting step in the second reaction zone is re-used in the first reaction zone for blowing and/or oxidation. For maximum efficiency, preferably all of the hot exhaust gas is recycled to the first reaction zone.

Having generally described this invention, a further understanding can be obtained by reference to certain specific examples which are provided herein for purposes of illustration only and are not intended to be limiting unless otherwise specified.

EXAMPLES

Example 1

Figure 4A:
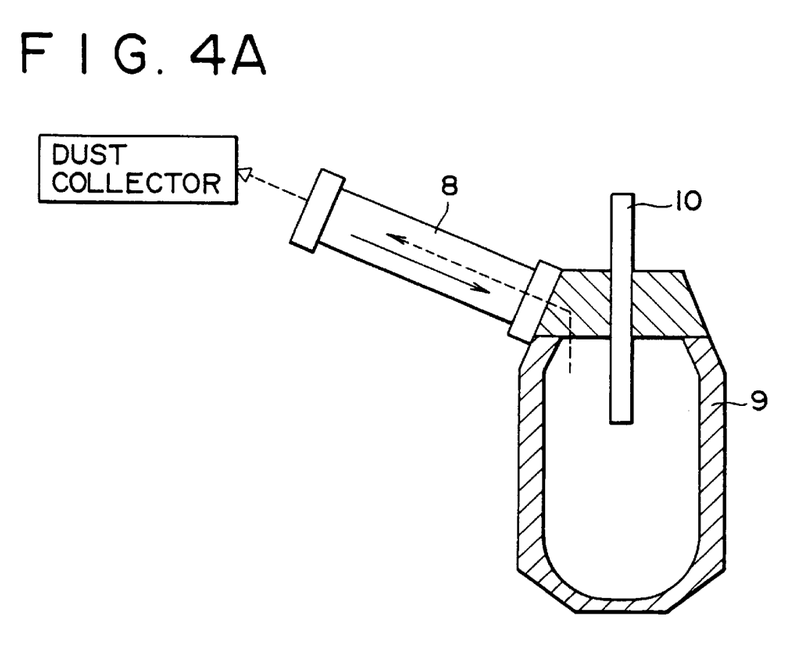
FIGS. 4(a) and 4(b) are, respectively, schematic illustrative views showing a fundamental arrangement and an arrangement including a vertical duct provided between a rotary kiln and a melting furnace, both for typically carrying out the method of the invention.
Figure 4B:
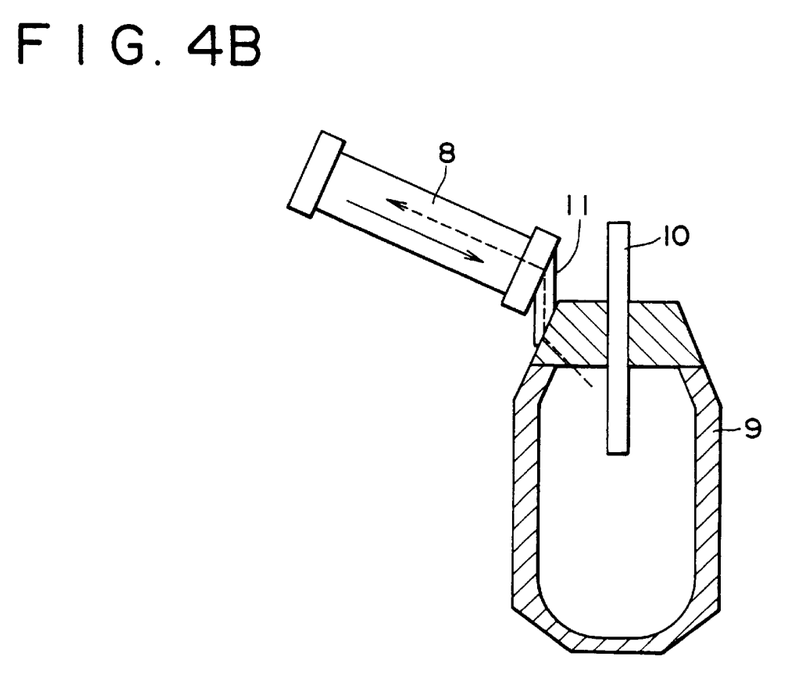

FIGS. 4(a) and (b) are, respectively, a schematic illustrative view showing an apparatus useful in the present invention, which includes an electric furnace 9, including electrode 10, with a capacity of 1 ton and a rotary kiln 8 having a diameter of 1 m and a length of 12 m. FIG. 4(a)

illustrates a method of blowing out separated oxides from the kiln, and FIG. 4(b) illustrates a method wherein a vertical duct 11 is provided at the connection between the rotary kiln 8 and the electric furnace 9 wherein the separated oxides were blown out.

Initially, 500 kg of a thick plate scrap was melted in the electric furnace 9, after which 250 kg of cut pieces of an Sn-plated steel sheet and 250 kg of shredded scraps of a thick plate were continuously fed into the rotary kiln 8 at a rate of 30 kg/minute. The kiln was rotated at 1 r.p.m., and an oxygen concentration in an exhaust gas introduced from the electric furnace was found to be 10%.

The flow rate of the exhaust gas was changed by controlling the amount of secondary combustion of a gas generated from the steel melt surface in the electric furnace. After removal of Sn, the resultant pieces were fed into the electric furnace.

The flow rate of the exhaust gas, the oxygen concentration in the atmosphere, and the ambient temperature in the rotary kiln (see FIG. 4(a)) and in the vertical duct (see FIG. 4(b)) are shown in Table 3.

TABLE 3

| Flow rate (m/second) | Oxygen Concentration (% by volume) | Ambient Temperature (°C.) |
| --- | --- | --- |
| 0.2 | 5.0 | 800 |
| 0.6 | 10.0 | 1000 |

Figure 5A:
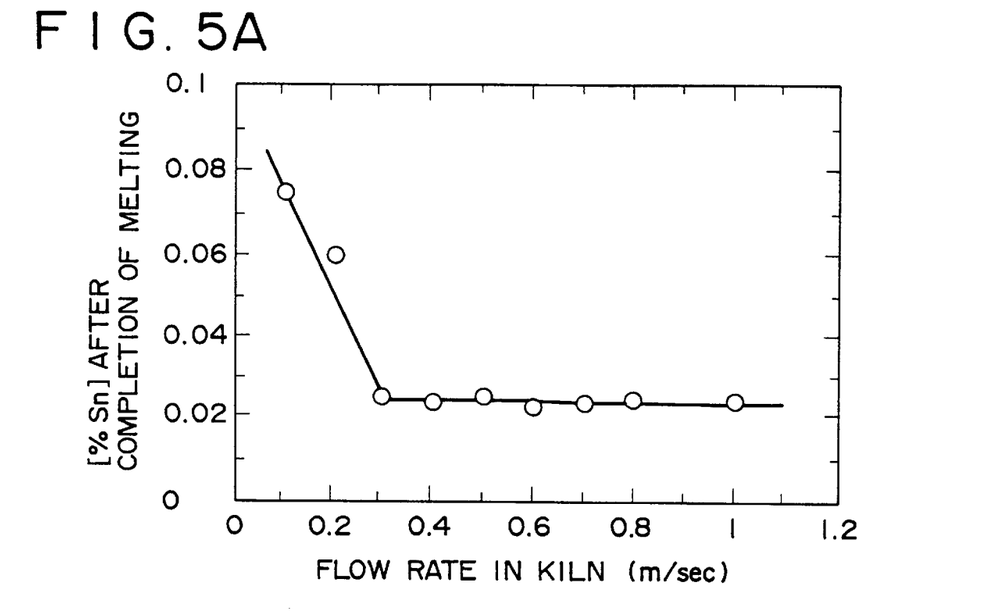
FIGS. 5(a) and 5(b) are, respectively, graphs showing the relation between the flow rate of a gas determined by use of the arrangements shown in FIGS. 4(a) and 4(b) and the content of Sn.
Figure 5B:
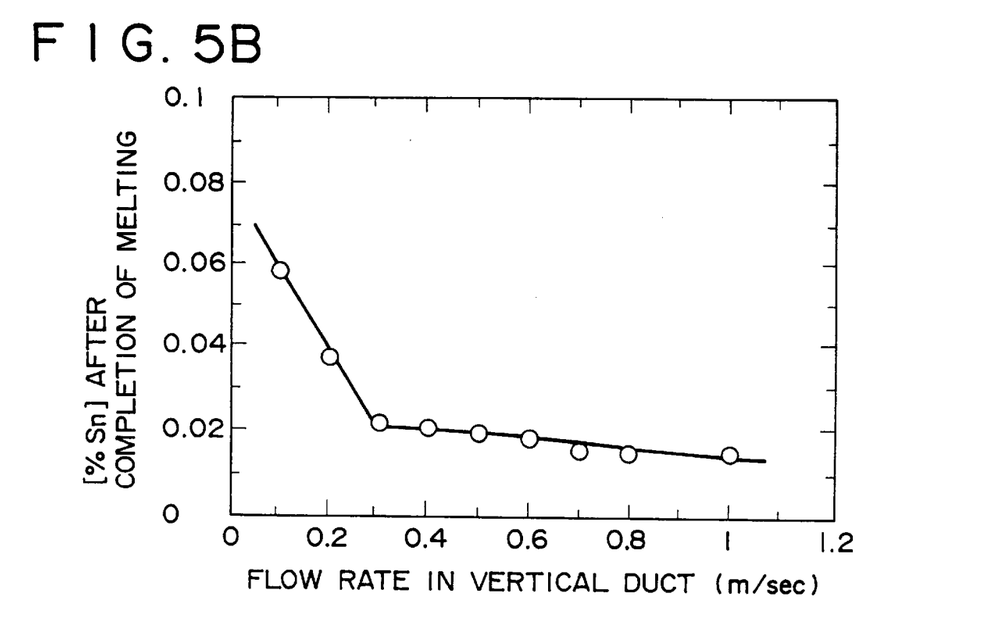

The results of analysis on the concentration of Sn in the steel melt after completion of the melting are shown in FIGS. 5(a) and 5(b).

From the results, it will be seen that where the wind velocity is 0.3 m/second or over for both cases of FIGS. 4(a) and 4(b), the Sn-containing, separated matter is collected in the dust collector, with a lowering of the concentration of Sn after the melting. It will also be seen that the provision of the vertical duct leads to an improved removal rate of Sn.

Example 2

An Sn surface layer was removed from pieces (about 50 mm in one side) of an Sn-plated steel sheet according to a conventional method and according to the inventive method, each described below.

(1) Conventional method: 250 kg of an Sn-plated sheet was charged into a rotary kiln and oxidized at 950° C. for 20 minutes in air, followed by separation of the resultant Sn oxides by shot blasting. After the separation, the steel and the oxides were separated from each other, and the steel sheet was melted in an electric furnace to determine a concentration of Sn. The time required for the separation of the Sn oxides was 20 minutes, and the time required for the screening of the Sn oxides was 20 minutes.

(2) Inventive method: 500 kg of a thick plate scrap was melted in an electric furnace, after which cut pieces of a Sn-plated steel sheet and 75-kg of shredded scraps of a thick plate were continuously fed into a rotary kiln at a range of 30 kg/minute. At the time, an oxygen concentration in an exhaust gas from the electric furnace was 10%, and the flow rate of the gas was 2 m/second. The cut pieces of the steel sheet after passage through the rotary kiln were fed to the electric furnace, followed by analysis of the concentration of Sn after melting.

The results are shown in Table 4.

TABLE 4

| | Removal rate of Sn | Treating Time Before Melting |
| --- | --- | --- |
| Conventional Method | 40% | 60 minutes |
| Inventive Method | 60% | 20 minutes |

According to the method of the invention, the treating time can be shortened and the removal rate of Sn is as high as 60% in contrast with the conventional method whose removal rate is 40%.

Example 3

In order to check the effect of mixing of an impactor with a steel scrap on the removal of Sn, the following test was conducted.

A rotary retort furnace was heated and set at 950° C. 10 to 100 kg of an Sn-plated steel sheet cut into pieces with a size of 7 cm×4 cm was charged into the furnace along with an impactor, followed by heating for 20 minutes at 1 r.p.m., in air. The impactor used was made of cut pieces of a thick sheet having an about 30 mm-by-30 mm square. The ratio by weight between the impactor and the Sn-plated steel sheet (i.e. weight of impactor/weight of Sn-plated steel sheet) was changed from 0 to 100. The Sn-plated steel sheet after the treatment was removed from the rotary retort furnace, followed by analysis of a concentration of Sn.

Figure 6:
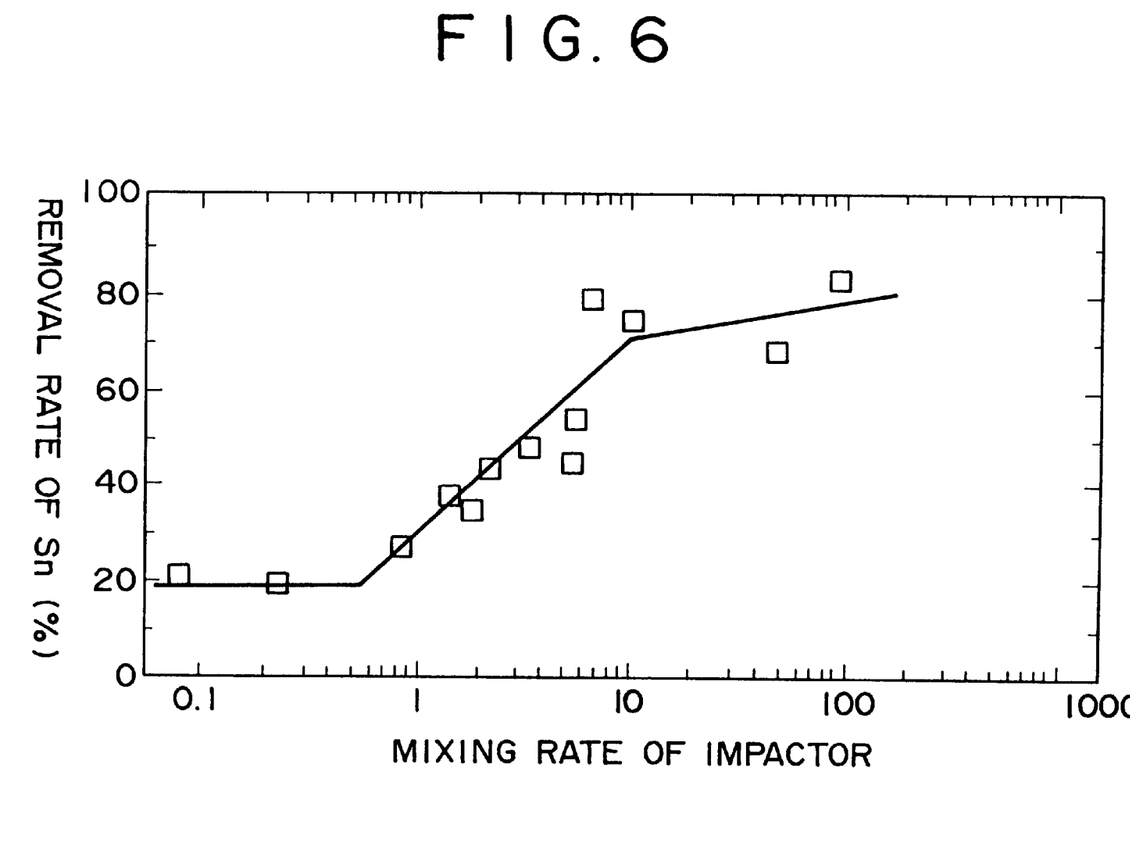
FIG. 6 is a graph showing the relation between the removal rate of Sn, i.e., the removal of Sn from the Sn-plated steel sheet, and the weight ratio of the impactor to the coated steel.

FIG. 6 shows the relation between the removal rate of Sn, i.e., the removal of Sn from the Sn-plated steel sheet, and the above-defined weight ratio. In order to improve the removal rate of Sn by mixing with the impactor, it is preferable that the weight ratio (impactor to coated steel) is 1 or more, preferably 10 or more.

As will be apparent from the foregoing, when an Sn-plated steel scrap is re-utilized, a heat energy which has been hitherto discharged to outside without being used in the melting step can be effectively utilized, along with an improved removal rate of Sn-containing oxides. Thus, the method of the invention is excellent in terms of production efficiency.

The entire disclosure of Japanese Patent Application No. Hei 8-342130 filed on Dec. 20, 1996 including specification, claims, drawings and summary is incorporated herein by reference in its entirety.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of separating a Sn-containing coating from steel, the method comprising introducing a steel coated with a layer comprising Sn to a first reaction zone;

oxidizing the layer comprising Sn with an oxidizing gas to form Sn-containing oxides;

blowing the Sn-containing oxides away from the steel using the oxidizing gas;

melting the steel to produce a refined steel and an exhaust gas in a second reaction zone; and recycling at least a portion of the exhaust gas to the first reaction zone, wherein the oxidizing gas consists of the at least a portion of the exhaust gas produced during the melting of the steel.

2. The method of claim 1, wherein a flow rate of the oxidizing gas is at least 0.3 m/second.

3. The method of claim 1, wherein the melting, recycling, and blowing are conducted simultaneously.

4. The method of claim 3, further comprising, prior to the blowing, heating the steel coated with a layer comprising Sn to oxidize at least a portion of the layer and form Sn-containing oxides; and separating at least a portion of the Sn-containing oxides from the steel, wherein the heating, separating, and blowing are conducted in the first reaction zone; and the oxidizing gas consists of the at least a portion of the exhaust gas produced during the melting of the steel.

5. The method of claim 4, wherein a flow rate of the oxidizing gas in the first reaction zone is at least 0.3 m/second.

6. The method of claim 4, wherein the blowing is conducted in a rotary kiln in the first reaction zone and the melting is conducted in a steel melting furnace in the second reaction zone.

7. The method of claim 4, wherein the blowing is conducted in a rotary kiln, which comprises an exhaust portion, and the melting is conducted in a steel melting furnace, which comprises a discharge portion directly connected to the exhaust portion.

8. The method of claim 4, wherein the blowing is conducted in a rotary kiln, which comprises an exhaust portion, and the melting is conducted in a steel melting furnace, which comprises a discharge portion connected to the exhaust portion by a substantially vertical duct.

9. The method of claim 4, wherein the separating comprises using an impactor.

10. The method of claim 9, wherein a weight ratio of the impactor to the steel coated with a layer comprising Sn is at least 1.

11. A method of making a reclaimed steel, the method comprising:

(a) heating a coated steel comprising a Sn-containing surface layer to form Sn-containing oxides from at least a portion of the surface layer;

(b) separating at least a portion of the Sn-containing oxides from the coated steel to produce separated Sn-containing oxides and an uncoated steel;

(c) blowing the separated Sn-containing oxides away from the uncoated steel using a blown gas, wherein (a), (b), and (c) are conducted in a first reaction zone;

(d) melting the uncoated steel in a second reaction zone to produce the reclaimed steel and an exhaust gas; and (e) recycling at least a portion of the exhaust gas produced in the second reaction zone to the first reaction zone, wherein the blown gas consists of the at least a portion of the exhaust gas, and (a), (b), (c), (d), and (e) are conducted simultaneously.

12. The process of claim 11, wherein a flow rate of the blow gas during the blowing is at least 0.3 m/second.

13. The process of claim 11, wherein the recycled exhaust gas also oxidizes the Sn-containing surface layer of the coated steel in the first reaction zone.

14. The method of claim 11, wherein the heating, separating and blowing are conducted in a rotary kiln in the first reaction zone and the melting is conducted in a steel melting furnace in the second reaction zone.

15. The method of claim 11, wherein the heating, separating and blowing are conducted in a rotary kiln, which comprises an exhaust portion, an the melting is conducted in a steel melting furnace, which comprises a discharge portion directly connected to the exhaust portion.

16. The method of claim 11, wherein the heating, separating and blowing are conducted in a rotary kiln, which comprises an exhaust portion, and the melting is conducted in a steel melting furnace, which comprises a discharge portion connected to the exhaust portion by a substantially vertical duct.

17. The method of claim 11, wherein the separating comprises using an impactor.

18. The method of claim 17, wherein a weight ratio of the impactor to the coated steel is at least 1.

* * * * *